United States Patent [19]
Tabuchi et al.

[11] Patent Number: 5,435,340
[45] Date of Patent: Jul. 25, 1995

[54] PIPE COUPLING APPARATUS

[75] Inventors: Masashi Tabuchi, Osaka; Haruhiko Shimizu, Nishinomiya, both of Japan

[73] Assignee: Yano Giken Co., Ltd., Japan

[21] Appl. No.: 61,361

[22] Filed: May 19, 1993

[30] Foreign Application Priority Data

Oct. 14, 1992 [JP] Japan .................. 4-274749

[51] Int. Cl.$^6$ .................. F16K 43/00; F16L 41/06; F16L 55/10
[52] U.S. Cl. .................. 137/318; 138/94; 138/97; 251/249.5; 251/266
[58] Field of Search .................. 137/15, 318, 317; 138/97, 92, 94; 30/94, 95, 96; 83/54, 745; 251/248, 249.5, 250.5, 266

[56] References Cited

U.S. PATENT DOCUMENTS

| | | | |
|---|---|---|---|
| 314,085 | 3/1885 | Van Norman | 137/318 |
| 2,171,942 | 9/1939 | Mueller | 137/318 |
| 2,237,476 | 4/1941 | Cline | 137/318 |
| 2,756,486 | 7/1956 | Smith | 137/318 |
| 2,763,282 | 9/1956 | Reedy et al. | 137/318 |
| 3,867,964 | 2/1975 | Gardner | 137/318 |
| 3,995,655 | 12/1976 | Sands | 137/318 |
| 4,127,141 | 11/1978 | Ledonne et al. | 137/318 |
| 4,216,793 | 8/1980 | Volgstadt et al. | 137/318 |
| 5,052,431 | 10/1991 | Jiles | 137/318 |
| 5,054,512 | 10/1991 | Jiles | 137/318 |

FOREIGN PATENT DOCUMENTS

| | | | |
|---|---|---|---|
| 1158010 | 6/1958 | France | 137/318 |
| 1377703 | 9/1964 | France . | |
| 2573508 | 5/1986 | France . | |
| 961585 | 3/1957 | Germany | 137/318 |
| 1252983 | 10/1967 | Germany | 137/318 |
| 2253022 | 8/1992 | United Kingdom . | |

*Primary Examiner*—George L. Walton
*Attorney, Agent, or Firm*—Webb Ziesenheim Bruening Logsdon Orkin & Hanson

[57] ABSTRACT

A pipe coupling apparatus includes a coupling case for surrounding an outer periphery of an existing pipe in a sealed state. The coupling case defines a pipe coupling opening for coupling a new pipe to the coupling case, and an executing opening for use in cutting a branching opening in the existing pipe. A lid is mounted on the coupling case for sealing the executing opening. The branching opening is formed in a way to prevent a fluid from flowing out of the executing opening. The coupling case houses a first valve operable from outside the coupling case to open and close the coupling opening, and a second valve also operable from outside the coupling case to move into the existing pipe through the branching opening for closing one of passages defined by the existing pipe and communicating with the branching opening.

14 Claims, 10 Drawing Sheets

PIPE COUPLING APPARATUS

BACKGROUND OF THE INVENTION

1. Field of the Invention

This invention relates to pipe coupling apparatus, and more particularly to a pipe coupling apparatus having a coupling case for surrounding an outer periphery of an existing pipe in a sealed state, the coupling case defining a pipe coupling opening for coupling a new pipe, and an executing opening formed in the coupling case for cutting a branching opening in the existing pipe. A sealing device is mounted on the coupling case for sealing the executing opening. The branching opening is cut while a fluid is prevented from flowing out of the executing opening.

2. Description of the Prior Art

The above pipe coupling apparatus allows the new pipe to be connected to the existing pipe through the coupling case without requiring a separate operation to stop the fluid flowing through the existing pipe. The existing pipe and new pipe may be connected to be in intercommunicating condition by attaching the coupling case to the existing pipe, coupling the new pipe to the coupling opening of the coupling case, cutting the branching opening in the existing pipe, and sealing the executing opening with the sealing device. It is necessary to carry out the operation in the sequence that, after attaching the coupling case to the existing pipe, the new pipe is connected to the coupling opening and laid along a predetermined course, and thereafter the branching opening is cut in the existing pipe.

After the existing pipe and new pipe are connected through the coupling case, a fluid line may be switched, without stopping the fluid flow as noted above, to cause the fluid to flow from one of passages defined by the existing pipe and communicating with the branching opening to the new pipe. The portion of the existing pipe defining the other passage may be removed. In this case, the portion of the existing pipe to be put out of service must be cut and removed after shutting the other passage with a valve introduced into the coupling case through the executing opening and into the existing pipe through the branching opening.

According to the prior art noted above, the existing pipe and new pipe are connected through the coupling case without stopping the fluid flow. The fluid line may be switched, again without stopping the fluid flow, to cause the fluid to flow from one of the passages defined by the existing pipe and communicating with the branching opening to the new pipe. The portion of the existing pipe defining the other passage may be removed. For this purpose, the new pipe is laid in place after completing attachment of the coupling case to the existing pipe. After the new pipe is laid in place, the branching opening is cut in the existing pipe, and the valve is introduced into the coupling case through the executing opening. Next, the other passage defined by the pipe and communicating with the coupling opening is shut with the valve, and the portion of the pipe to be put out of service is cut and removed. Such a process is incapable of consecutively and efficiently carrying out the operations relating to the coupling case to attach the coupling case to the existing pipe, to cut the branching opening in the existing pipe, and to introduce the valve into the coupling case through the executing opening, as well as the pipe installing operation relating to the new pipe and existing pipe.

SUMMARY OF THE INVENTION

The present invention has been made having regard to the state of the art noted above, and its object is to provide a pipe coupling apparatus with an improved mechanism for shutting a fluid passage between an existing pipe and a coupling opening of a coupling case, to allow the operations relating to the coupling case and the pipe installing operation relating to the new pipe and existing pipe to be carried out consecutively and efficiently when connecting the existing pipe and new pipe without requiring a separate operation to stop the fluid flow, and switching the fluid line to extend through one of the passages defined by the existing pipe and communicating with the branching opening to the new pipe.

The above object is fulfilled, according to the present invention, by a pipe coupling apparatus as set out in the outset hereof, in which the coupling case houses a first valve operable from outside the coupling case to open and close the pipe coupling opening, and a second valve also operable from outside the coupling case to move into the existing pipe through the branching opening for closing one of passages defined by the existing pipe and communicating with the branching opening.

The above construction provides the following functions and effects.

The coupling case is attached to the existing pipe first, and the pipe coupling opening is sealed with a stop-up plate or the like attached from outside the coupling case. Then, the branching opening is formed in the existing pipe.

Next, the first and second valves are introduced into the coupling case. The first valve is operated from outside the coupling case to close the pipe coupling opening. Thereafter the stop-up plate or the like is removed from the pipe coupling opening.

At least the first valve may be mounted in the coupling case prior to attachment to the existing pipe, in a way not to interfere with the operation to form the branching opening in the existing pipe. The existing pipe is cut to form the branching opening, with the pipe coupling opening closed by the first valve.

Next, the new pipe is connected to the coupling opening and laid in place along a predetermined course. The first valve is operated from outside the coupling case to move away from the pipe coupling opening. The second valve in the coupling case is operated from outside to close one of the passages defined by the existing pipe and communicating with the branching opening. The portion of the existing pipe to be put out of service is cut off and removed.

Thus, according to the present invention, the existing pipe and new pipe may be connected through the coupling case without requiring a separate operation to stop the fluid flow. The fluid line may be switched to cause the fluid to flow from one of the passages through the existing pipe communicating with the branching opening to the new pipe. This process is carried out consecutively and efficiently, including the operations relating to the coupling case to attach the coupling case to the existing pipe, to cut the branching opening in the existing pipe, and to close the other passage defined by the existing pipe and communicating with the branching opening, as well as the pipe installing operation relating to the new pipe and existing pipe.

This apparatus has the first and second valves which may be introduced into the coupling case through the executing opening. The coupling case, before having these valves introduced thereinto, may be used in cutting the branching opening in the existing pipe. Thus, the coupling case may be formed compact, without a mutual interference between the cutting device and valves.

The first valve may be adapted movable along an inner peripheral wall of the coupling case to close the pipe coupling opening communicating with the coupling case, and a pressing mechanism may be provided between the first valve and the coupling case. This pressing mechanism is operable, with movement of the first valve to a position to close the pipe coupling opening, to press the first valve against the inner peripheral wall of the coupling case. The first valve is pressed hard against the inner peripheral wall of the coupling case to close the pipe coupling opening reliably.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

A pipe coupling apparatus according to the present invention will be described in detail hereinafter with reference to the drawings.

Figure 10:
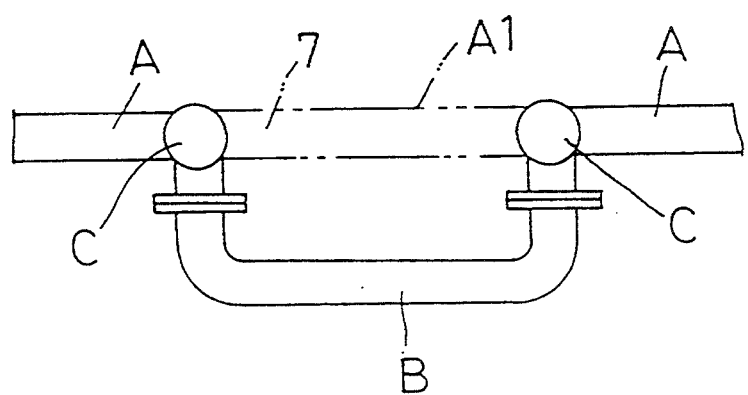
FIG. 10 is a schematic plan view showing how pipes are installed.

Referring to FIG. 10, an existing water pipe A is laid underground, and a new water pipe B is to be connected to the existing water pipe A to extend between two positions thereof, without requiring a separate operation to stop water flowing through the existing water pipe A. The existing water pipe portion A1 between the positions of connection is to be put out of service. Water will then flow from the existing water pipe A to the new water pipe B, and back to the existing water pipe A. This passage switching operation is carried out by using pipe coupling apparatus C.

Figure 1:
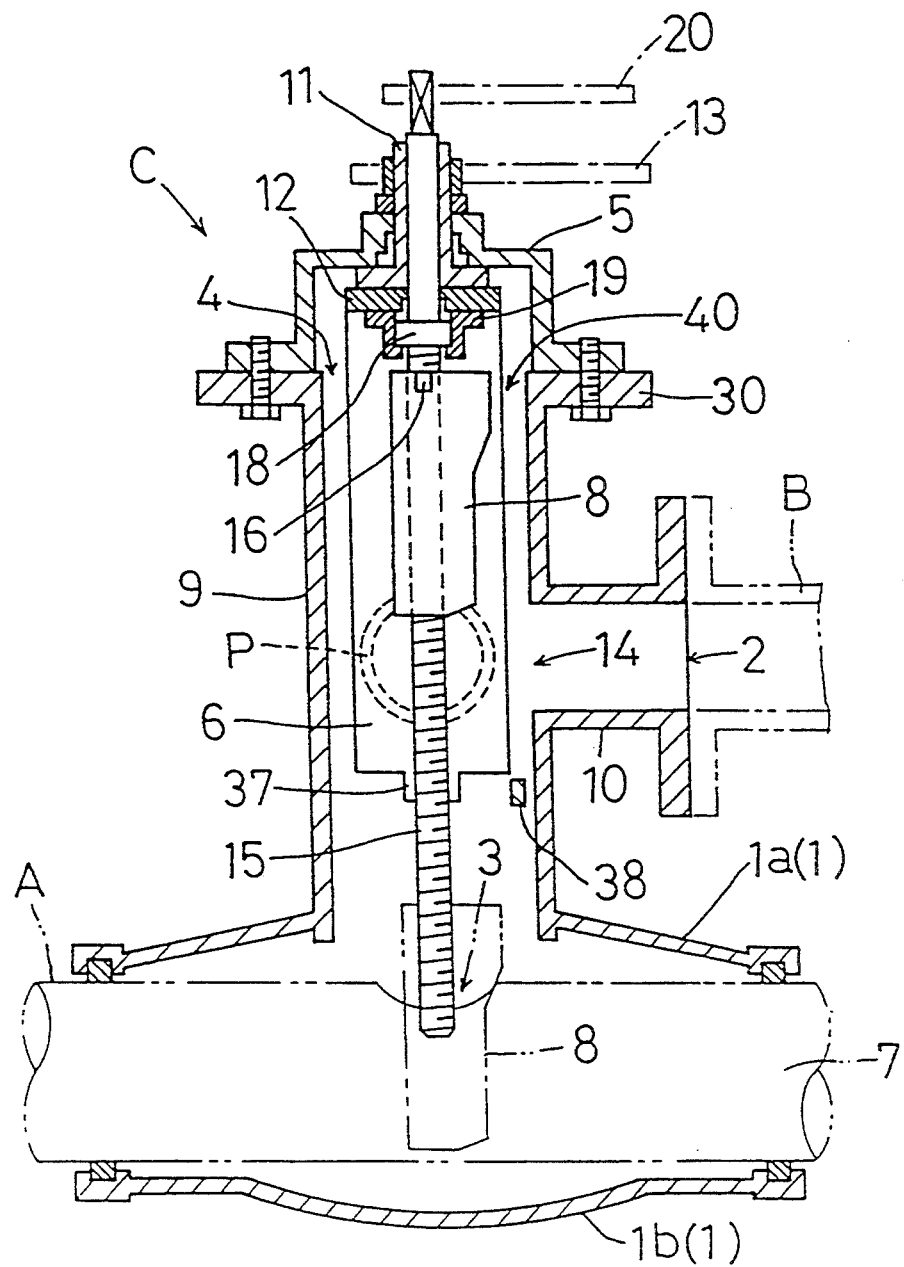
FIG. 1 is a sectional side view of a pipe coupling apparatus according to the present invention.

As shown in FIG. 1, each pipe coupling apparatus C includes a coupling case 1 for surrounding a periphery of the existing water pipe A. The coupling case 1 defines a pipe coupling opening 2 for coupling the new water pipe B, an executing opening 4 for use in cutting a branching opening 3 in the existing water pipe A, and a lid 5 acting as a sealing device to seal the executing opening 4. The coupling case 1 houses a first valve 8 switchable between a position to allow the water to flow out of the coupling opening 2 and a position to stop the water flowing out of the coupling opening 2. The coupling case 1 further houses a second valve 8 movable into the existing water pipe A through the branching opening 3 to shut one of water passages defined by the existing water pipe A and communicating with the branching opening 3.

The coupling case 1 is divided into two split case portions 1a and 1b radially fixable to the outer periphery of the existing water pipe A in watertight condition. One of the split case portions 1a includes a cylindrical executing case 9 defining the executing opening 4. This executing case 9 communicates with a cylindrical member 10 extending radially thereof and at right angles thereto. The cylindrical member 10 defines the pipe coupling opening 2.

Figure 2:
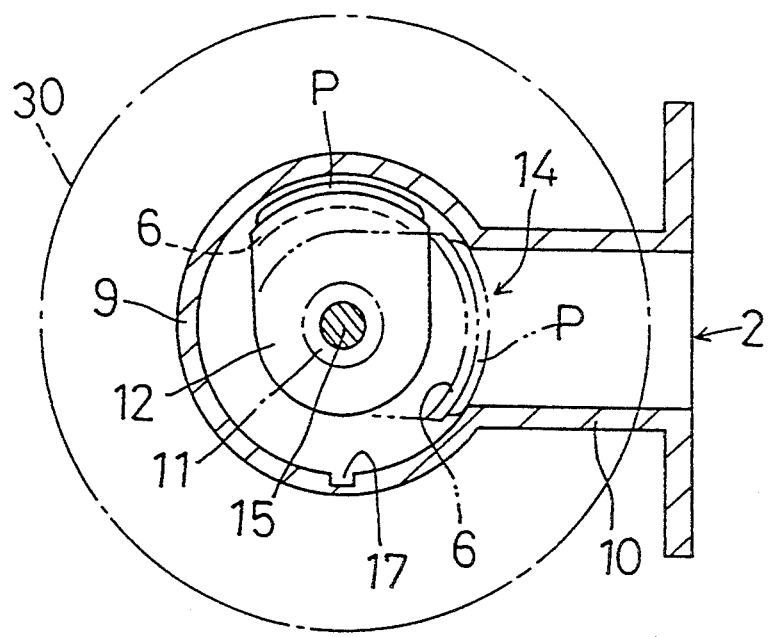
FIG. 2 is a plan view, partly in section, of a principal portion of the apparatus.

As shown in FIG. 2, the first valve 6 has the shape of a hollow cylinder segment extending along an inner peripheral wall of the executing case 9. The first valve 6 is bolted through a fan-shaped connecting plate 12 to a tubular valve stem 11 supported by the lid 5. By operating a control handle 13 fitted on a non-circular section at an upper end of the valve stem 11, the first valve 6 is movable along the inner peripheral wall of the executing case 9. Thus, the first valve 6 is switchable between the position to allow the water to flow out of the coupling opening 2 and the position to stop the water flowing out of the coupling opening 2. In the former, the first valve 6 closes, through a packing P, an opening 14 formed in the inner peripheral wall of the executing case 9 and communicating with the cylindrical member 10.

Figure 4A:
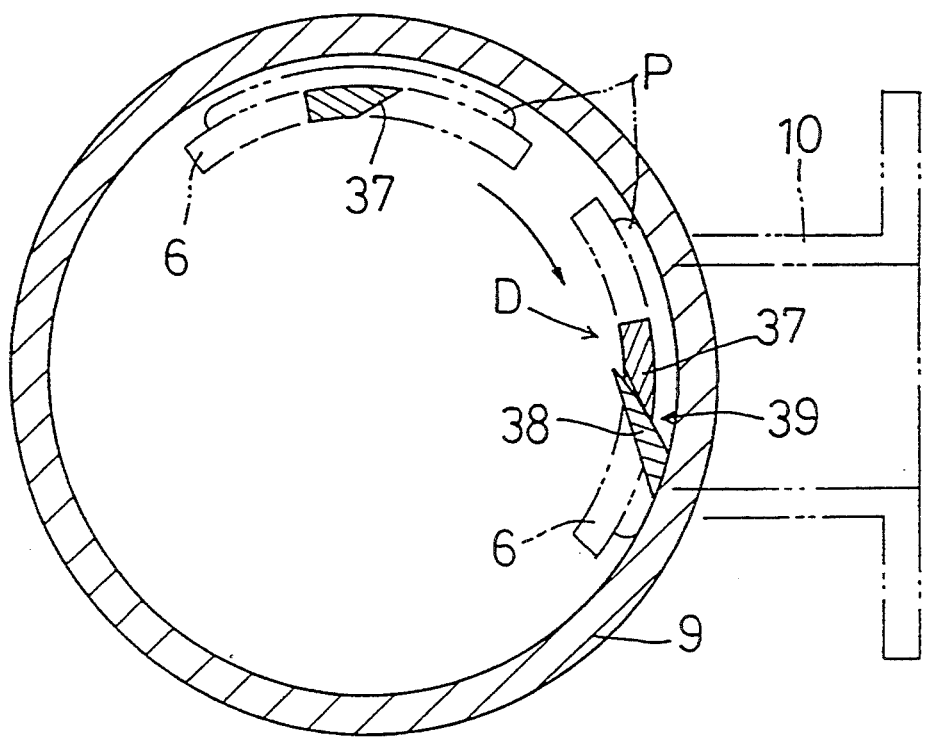
Figure 4B:
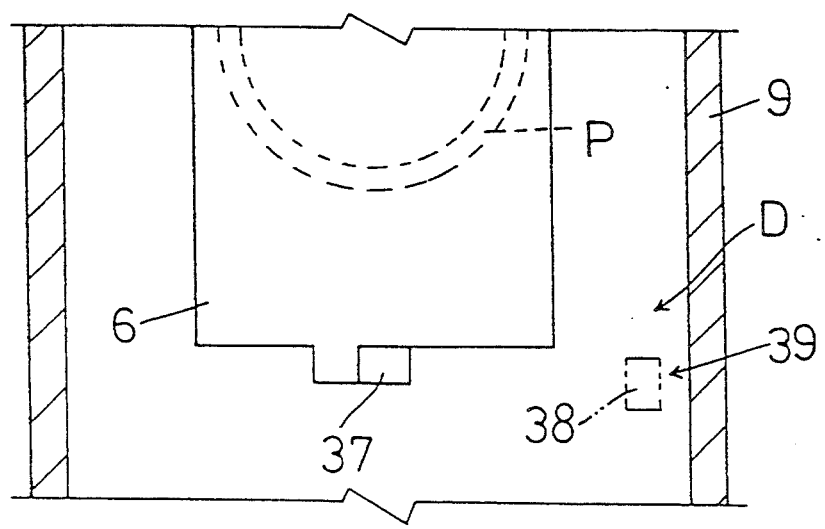
Figure 5:
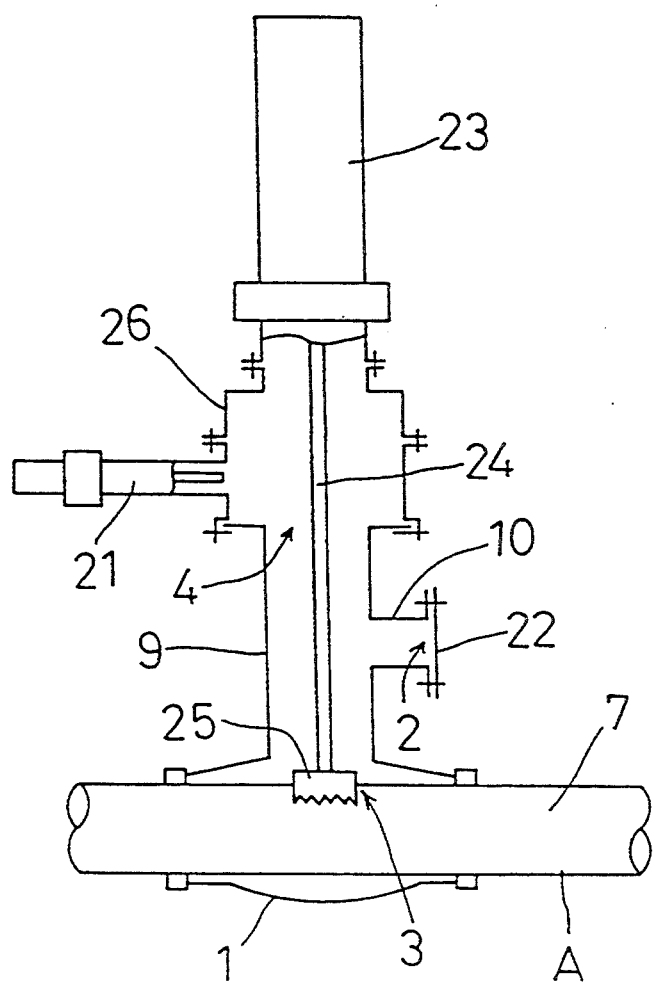
FIGS. 5 through 9 are schematic sectional views showing an operating sequence.

As shown in FIGS. 4 (a) and (b), a pressing mechanism D is provided between the first valve 6 and executing case 9. The pressing mechanism D presses the first valve 6 against the inner peripheral wall of the executing case 9 when the first valve 6 is moved to the position to close the opening 14 formed in the inner peripheral wall of the executing case 9.

The pressing mechanism D includes a wedge 37 formed at a lower end of the first valve 6, and a guide 38 fixed to the inner peripheral wall of the executing case 9 to extend in a circumferential direction thereof. The guide 38 is tapered in an arcuate form toward a distal end thereof. As the first valve 6 is moved toward the position to close the opening 14, a forward end of the wedge 37 enters a space 39 between the guide 38 and the inner peripheral wall of the executing case 9. Then, the wedge 37 contacts the guide 38 to be pushed toward the inner peripheral wall of the executing case 9, thereby pushing the first valve 6 toward the inner peripheral wall of the executing case 9. As a result, the first valve 6 is set to the position to close the opening 14, with the packing P placed in pressure contact with the inner peripheral wall of the executing case 9.

Figure 3:
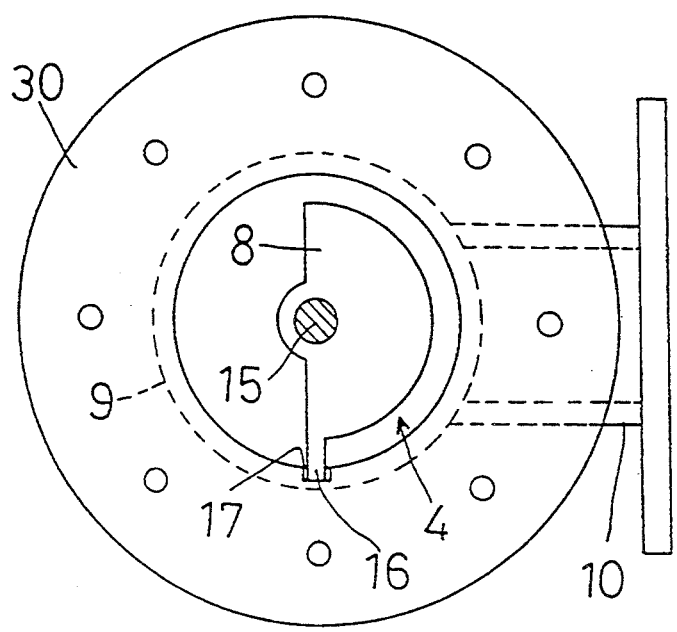
FIG. 3 is a plan view of the principal portion, FIG. 4 (a) is a sectional plan view of the principal portion, FIG. 4 (b) is a side view of the principal portion.

The second valve 8 is meshed with a screw shaft 15 rotatably fitted inside the valve stem 11 of the first valve 6. As shown in FIG. 3, the second valve 8 has an engaging piece 16 formed integral with one side thereof for engaging a guide groove 17 formed in the inner peripheral wall of the executing case 9 to prevent rotation of the second valve 8. The screw shaft 15 has a flange 18 securely fitted in a flange seat 19 bolted along with the connecting plate 12 to the valve stem 11. The screw shaft 15 is rotatable by operating a control handle 20 fitted on a non-circular section at an upper end of the screw shaft 15. With rotation of the screw shaft 15, the second valve 8 is vertically movable along the guide groove 17.

Next, a water passage switching process using the above pipe coupling apparatus C will be described next. After this process, water will flow from the existing water pipe A to the new water pipe B, and back to the existing water pipe A.

(1) The coupling case 1 is fixed peripherally of each of the two positions of the existing water pipe A having in between a passage 7 to be put out of service. A sluice valve 21 is fixed to the executing opening 4, and the pipe coupling opening 2 is sealed with a stop-up plate 2. A drill case 26 housing a hole saw 25 connected to a drive shaft 24 of a drive device 23 is connected to the sluice valve 21. Then, the branching opening 3 is cut through a peripheral wall of the existing water pipe A.

Figure 6:
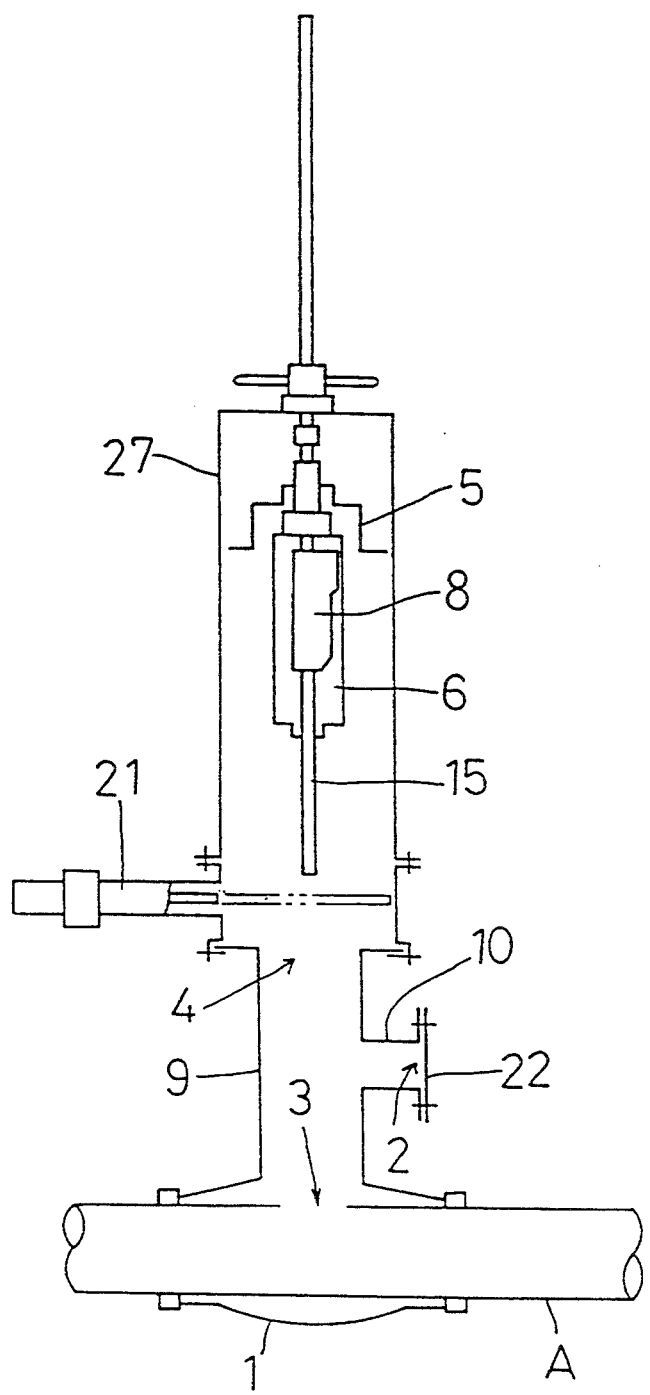

(2) The hole saw 25 is raised into the drill case 26 along with a cut-out piece off the branching opening 3. The sluice valve 21 is closed. The drill case 26 is removed and, as shown in FIG. 6, a lid attaching case 27 housing the lid 5 carrying the first valve 6 and second valve 8 is connected to the sluice valve 21. The sluice valve 21 is then opened, and the lid 5 is moved toward the executing case 9. The lid 5 is bolted to a flange 30 around the executing opening 4, with the engaging piece 16 fitted in the guide groove 17, as shown in FIGS. 1 and 3.

Figure 7:
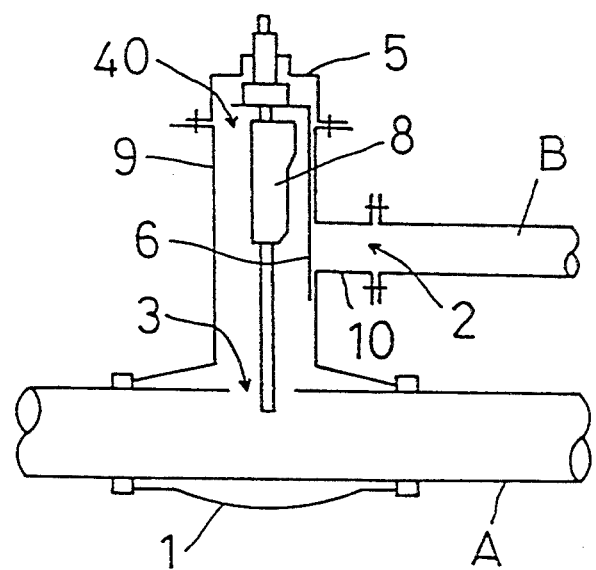

(3) Next, as shown in FIG. 7, the first valve 6 is switched to the position to stop the water flowing out of the pipe coupling opening 2. The stop-up plate 22 is removed from the coupling opening 2, and the new water pipe B is connected to the coupling opening 2.

Figure 8:
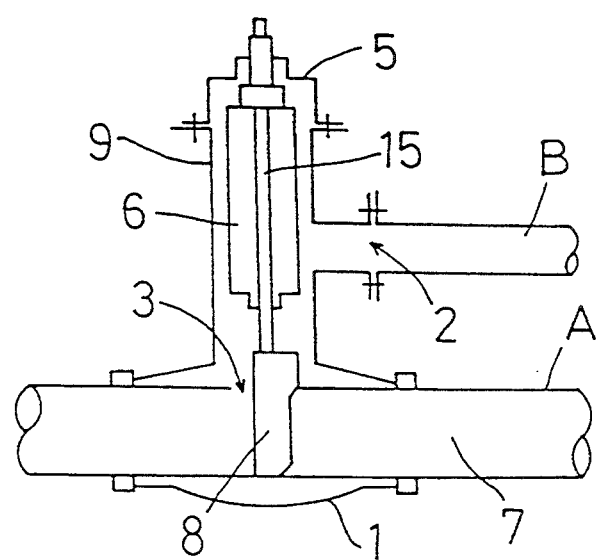

(4) As shown in FIG. 8, the first valve 6 is switched to the position to allow the water to flow out of the coupling opening 2. Thereafter, the screw shaft 15 is rotated to lower the second valve 8 along the guide groove 17. The second valve 8 is moved through the branching opening 3 into the existing water pipe A to close the passage 7 in the existing water pipe A to be put out of service.

Figure 9:
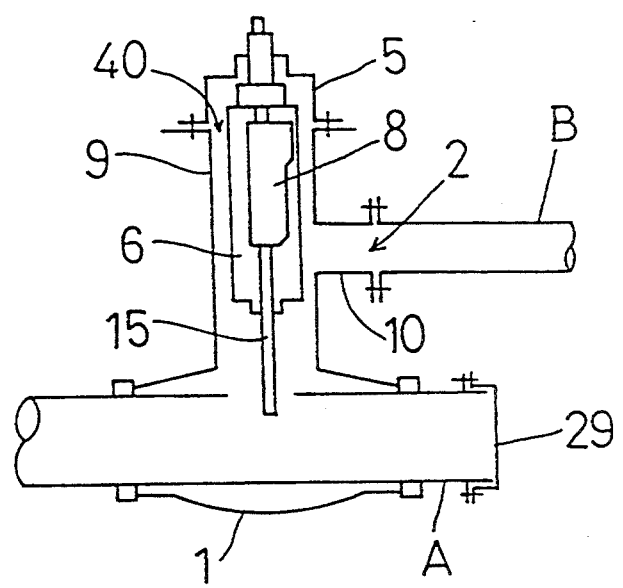

(5) As shown in FIG. 9, the portion of the existing water pipe A closed by the second valve 8 is cut off, and the cut end is closed with a cap 29. The screw shaft 15 is rotated in the opposite direction to raise the second valve 8 along the guide groove 17. The second valve 8 is raised into and fixed in place within a storage space 40 extending between an interior space of the lid 5 and an upper interior space of the executing case 9. The second valve 8 in this position applies little or no resistance to the water flowing from the executing case 9 through the opening 14 into the cylindrical member 10. This completes the passage switching process.

After the switching process, the lid 5 may be replaced with a different lid (not shown) having no first valve 6 or second valve 8. However, it will be convenient to leave the first valve 6 and second valve 8 as they are to be used again at a later date when the passage through the new water pipe B is put out of use and the original passage is reinstated.

Figure 11:
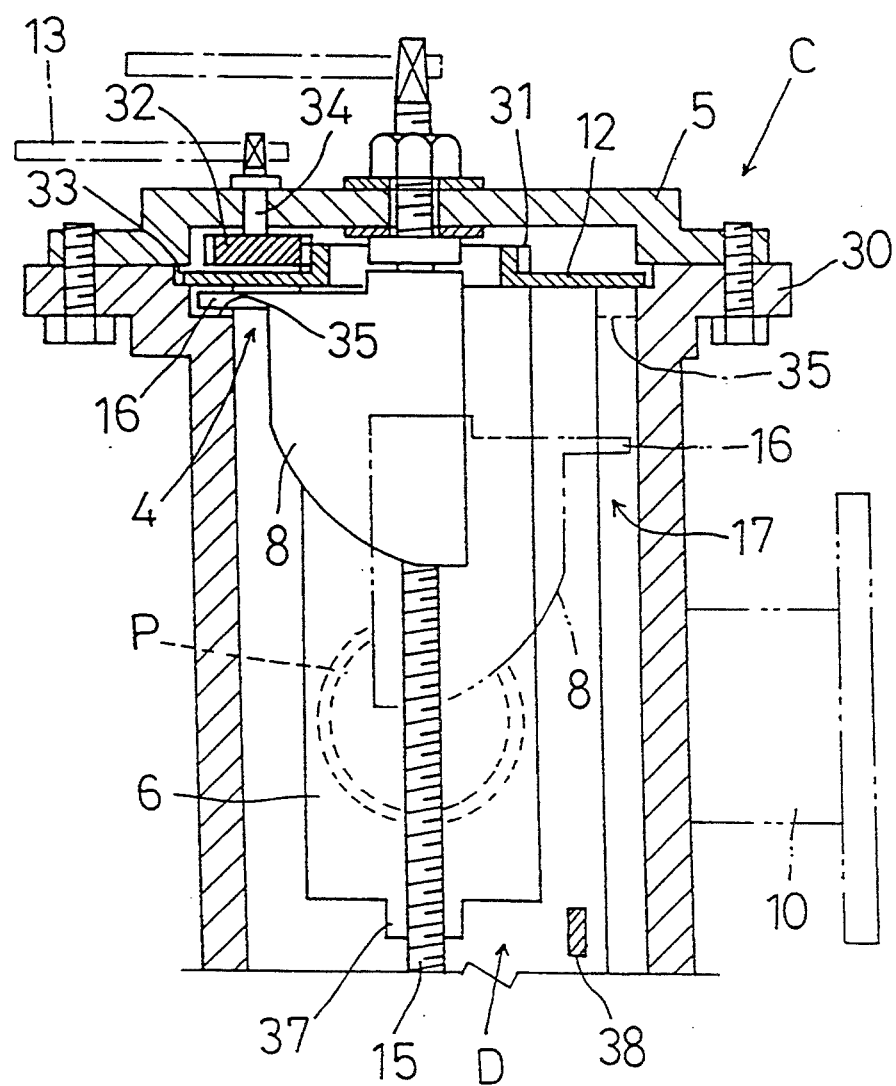
FIG. 11 is a sectional side view of a principal portion of another embodiment of the invention.
Figure 12:
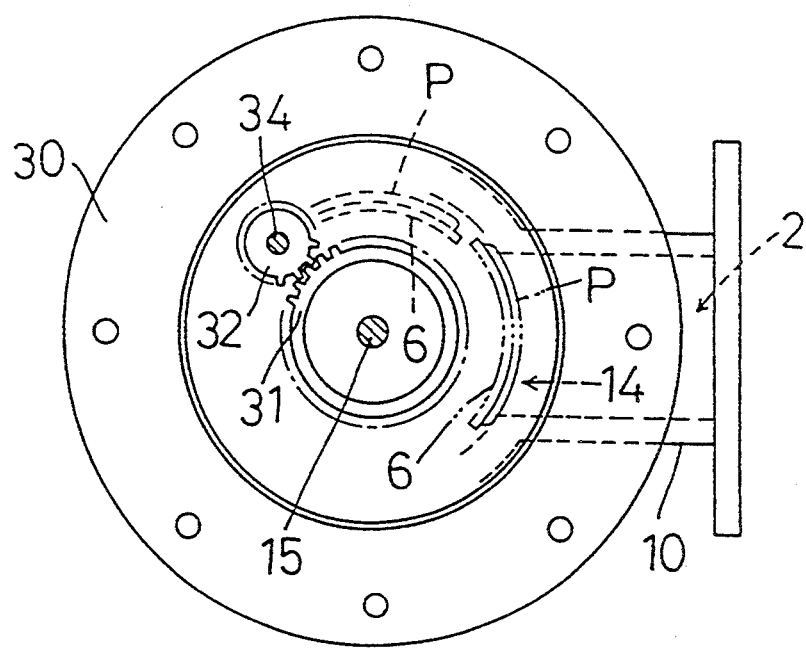
FIG. 12 is a plan view of the principal portion of FIG. 11 showing a first valve.

FIG. 11 shows a lid 5 having a first valve 6 and a second valve 8 in another embodiment. As also shown in FIG. 12, the first valve 6 is attached to a circular connecting plate 12 penetrated by a screw shaft 15. The connecting plate 12 defines a large gear 31 meshed with a small gear 32 supported by the lid 5. The connecting plate 12 is placed between an inner surface of the lid 5 and the second valve 8. The connecting plate 12 has an outer periphery thereof fitted in a peripheral groove 33 defined between the inner surface of the lid 5 and a shoulder formed on an inner peripheral edge of the flange 30 around the executing opening 4, thereby to prevent vertical movement of the first valve 6.

The small gear 32 is rotatable by operating a control handle 13 connected to a gear rotating shaft 34. This operation switches the first valve 6 between a position to close the opening 14 in the coupling case 1 communicating with the cylindrical member 10 to stop the water flowing out of the coupling opening 2, and a position away from the opening 14 to allow the water to flow out of the coupling opening 2.

Figure 13:
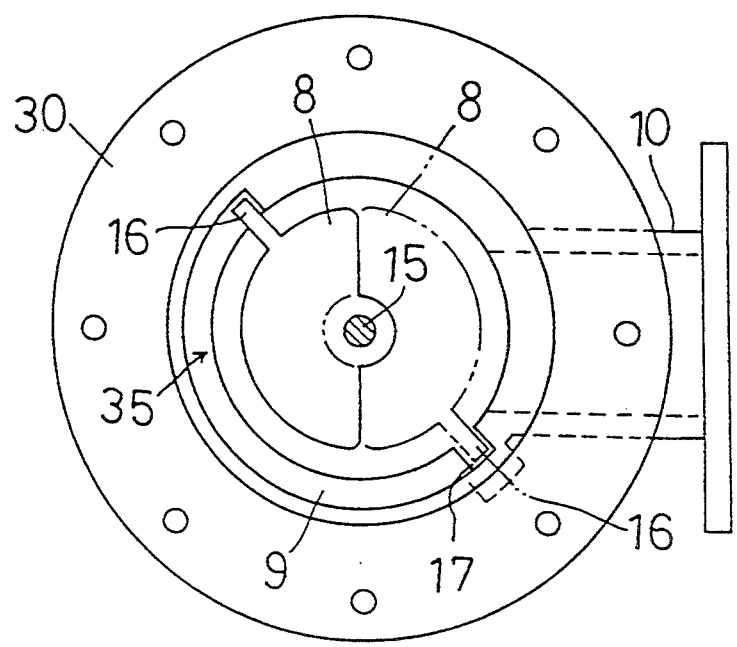
FIG. 13 is a plan view of the principal portion of FIG. 11 showing a second valve, and FIGS. 14 (a), (b) and (c) are schematic sectional side views of a further embodiment.

As also shown in FIG. 13, the second valve 8 has an engaging piece 16 resting on an arcuate shoulder 35 formed on the inner peripheral edge of the flange 30 around the executing opening 4 after the lid 5 is bolted to the flange 30. When the screw shaft 15 is rotated counterclockwise, the second valve 8 is rotated together whereby the engaging piece 16 moves into contact with an inlet wall of a guide groove 17 formed at a terminal end of the shoulder 35. With the second valve 8 thereby stopped rotating, a further counterclockwise rotation of the screw shaft 15 causes the second valve 8 to move downward along the guide groove 17, with the engaging piece 18 fitted in the guide groove 17 as shown in a two-dot-and-dash line in FIG. 13.

Other details of this embodiment are the same as in the embodiment shown in FIG. 1.

Figure 14A:
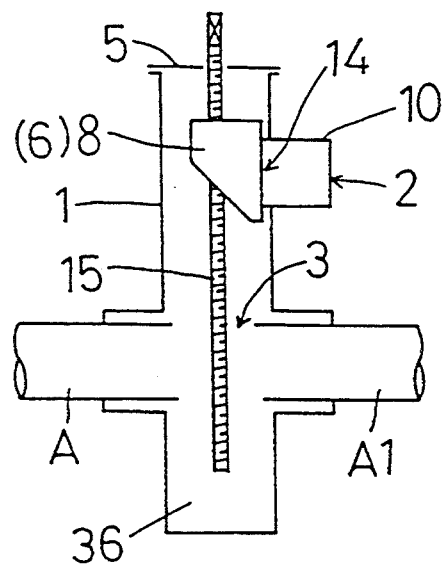
Figure 14B:
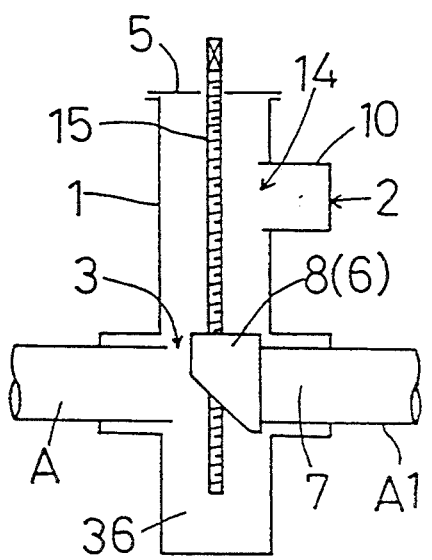
Figure 14C:
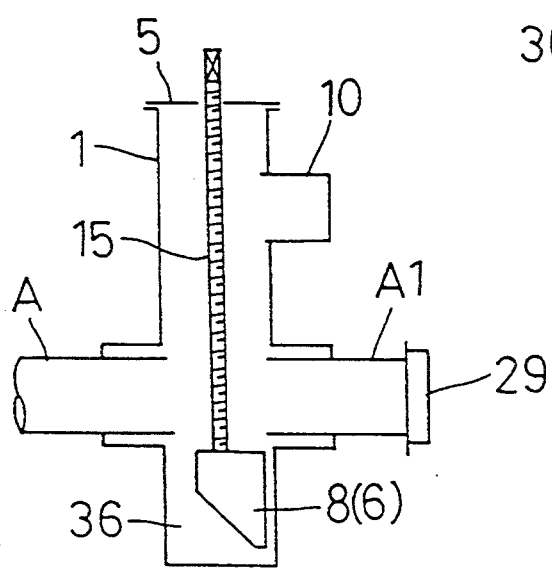

FIGS. 14 (a), (b) and (c) show a further embodiment in which the second valve 8 performs the function of the first valve also, The screw shaft 15 is rotated in one direction after the branching opening 3 is cut radially of the existing water pipe A. Then, as shown in FIG. 14 (a), the second valve 8 is moved downward along the guide groove 17 to a position to close the opening 14 in the coupling case 1 communicating with the cylindrical member 10 to stop the water flowing out of the coupling opening 2. With a further rotation of the screw shaft 15, as shown in FIG. 14 (b), the second valve 8 moves away from the opening 14 to allow the water to flow out of the coupling opening 2. Subsequently, the second valve 8 enters the existing water pipe A through the branching opening 3 to close the passage 7 in the existing water pipe A to be put out of service.

The existing water pipe portion A1 closed by the second valve 8 is cut off, and the cut end is closed with a cap 23. With a further rotation of the screw shaft 15, as shown in FIG. 14 (c), the second valve 8 moves into and rests in a space 36 defined in the bottom of the coupling case 1.

Other details of this embodiment are the same as in the embodiment shown in FIG. 1.

The foregoing embodiments may be modified as follows:

(1) The pipe coupling apparatus according to the present invention is applicable not only to water pipes, but may be used also in switching passages by coupling a new pipe to an existing pipe which transmits a different liquid or a gas.

(2) The pipe coupling apparatus according to the present invention is applicable not only to underground pipes but may be used also in switching passages by coupling a new pipe to an existing pipe on or above the ground.

(3) The pipe coupling apparatus according to the present invention may be used in cutting an existing pipe over a certain length to form branching openings.

(4) In the pipe coupling apparatus according to the present invention, one of the first and second valves may be mounted in the coupling case in advance in a state not to interfere with the operation of the cutting device.

Where the first valve is mounted in the coupling case in advance, a branching opening may be formed in an existing pipe, with the pipe coupling opening closed by the first valve.

(5) In the pipe coupling apparatus according to the present invention, one of the first and second valves may be removed from the coupling case after coupling a new pipe and switching the fluid passage.

(6) The pipe coupling apparatus according to the present invention may include an actuator mounted in the coupling case for operating one of the first and second valves. The valves may be operated from outside the coupling case through a cable or by radio.

(7) The control shafts for operating the first and second valves may be arranged coaxially in the double shaft construction as in the foregoing embodiments, or may be arranged separately to have individual axes.

What is claimed is:

1. A pipe coupling apparatus for bypassing flow from a portion of an existing pipe to a new pipe, said pipe coupling apparatus comprising:

a coupling case for surrounding an outer periphery of said existing pipe in a sealed state;

a pipe coupling opening formed in said coupling case for coupling said new pipe thereto;

an executing opening formed in said coupling case and defining a branch pipe extending between said existing pipe and said pipe coupling opening, said executing opening being adapted to receive means for cutting a branching opening in said existing pipe;

seal means mounted on said coupling case for sealing said executing opening;

a first valve housed in said coupling case and movable within said executing opening to open and close said pipe coupling opening that is defined by said branch pipe, said first valve movable within said executing opening into sealing engagement with said branch pipe to close said pipe coupling opening;

a first valve operating means for opening and closing said first valve, said first valve operating means operable from outside said coupling case to move said first valve within said executing opening to open and close said first valve and said pipe coupling opening;

a second valve housed in said coupling case and movable within said executing opening and configured to move into said existing pipe through said branch pipe and said branching opening for closing an internal portion of said existing pipe; and a second valve operating means for moving said second valve independent of said first valve, said second valve operating means operable from outside said coupling case.

2. A pipe coupling apparatus as defined in claim 1, wherein said first valve is movable along an inner peripheral wall of said coupling case to close said pipe coupling opening communicating with said coupling case, said pipe coupling apparatus further comprising a pressing mechanism provided between said first valve and said coupling case, said pressing mechanism being operable, with movement of said first valve by said first valve operating means to a position to close said pipe coupling opening, to press said first valve against the inner peripheral wall of said coupling case.

3. A pipe coupling apparatus as defined in claim 1, wherein said first valve and said second valve are movable into said coupling case through said executing opening.

4. A pipe coupling apparatus as defined in claim 3, wherein said first valve is movable along an inner peripheral wall of said coupling case to close said pipe coupling opening communicating with said coupling case, said pipe coupling apparatus further comprising a pressing mechanism provided between said first valve and said coupling case, said pressing mechanism being operable, with movement of said first valve by said first valve operating means to a position to close said pipe coupling opening, to press said first valve against the inner peripheral wall of said coupling case.

5. A pipe coupling apparatus as defined in claim 4, wherein said coupling case is divided into two split case portions radially fixable to the outer periphery of said existing pipe in fluid-tight condition.

6. A pipe coupling apparatus as defined in claim 5, wherein one of said split case portions includes a cylindrical member defining said pipe coupling opening, and a cylindrical executing case defining said executing opening, said cylindrical member communicating with said executing case, and extending radially of said executing case and at substantially a right angle thereto.

7. A pipe coupling apparatus as defined in claim 6, wherein said first valve has a shape of a hollow cylinder segment extending along an inner peripheral wall of said executing case, and said first valve operating means includes a connecting plate, a tubular valve stem, and a control handle, wherein said first valve is connected through said connecting plate to said tubular valve stem supported by said seal means with said control handle fitted on a non-circular section at an upper end of said valve stem, said first valve being movable along the inner peripheral wall of said executing case by operating said control handle to switch between the position to allow the fluid to flow out of said pipe coupling opening and the position to stop the fluid flowing out of said pipe coupling opening, said first valve closing, through a packing, an opening formed in the inner peripheral wall of said executing case and communicating with said cylindrical member.

8. A pipe coupling apparatus as defined in claim 6, wherein said pressing mechanism includes a wedge formed at a lower end of said first valve, and a guide fixed to the inner peripheral wall of said executing case to extend in a circumferential direction thereof, said guide being tapered in an arcuate form toward a distal end thereof.

9. A pipe coupling apparatus as defined in claim 6, wherein said second valve operating means includes a screw shaft, wherein said second valve is meshed with said screw shaft which is rotatably fitted inside said valve stem of said first valve operating means, said second valve having an engaging piece formed integral with one side thereof for engaging a guide groove formed in the inner peripheral wall of said executing case to prevent rotation of said second valve.

10. A pipe coupling apparatus as defined in claim 9, wherein said screw shaft has a flange securely fitted in a flange seat connected to said valve stem.

11. A pipe coupling apparatus as defined in claim 10, wherein said second valve operating means further includes a control handle fitted on a non-circular section at an upper end of said screw shaft, wherein said screw shaft is rotatable by operating said control handle fitted on said non-circular section at an upper end thereof, said second valve being vertically movable along said guide groove with rotation of said screw shaft.

12. A pipe coupling apparatus as defined in claim 1, wherein said first valve operating means includes a circular connecting plate and said second valve operating means includes a screw shaft supported by said seal means, wherein said first valve is attached to said circular connecting plate which is penetrated by said screw shaft supported by said seal means.

13. A pipe coupling apparatus as defined in claim 12, wherein said first valve operating means further includes a small gear supported by said seal means, wherein said connecting plate defines a large gear meshed with said small gear supported by said seal means, said connecting plate being placed between an inner surface of said seal means and said second valve.

14. A pipe coupling apparatus for bypassing flow from a portion of an existing pipe to a new pipe, said apparatus comprising:

a coupling case for surrounding an outer periphery of said existing pipe in a sealed state;

a pipe coupling opening formed in said coupling case for coupling said new pipe thereto;

an executing opening formed in said coupling case and defining a branch pipe extending between said existing pipe and said pipe coupling opening, said executing opening being adapted to receive means for cutting a branching opening in said existing pipe;

seal means mounted on said coupling case for sealing said executing opening;

a valve housed in said coupling case and movable within said executing opening and configured to selectively seal the pipe coupling opening defined by said branch pipe, said valve being movable along the length of said executing opening and into said existing pipe through said branching opening for selectively closing an interior portion of said existing pipe;

said coupling case further includes a space on a bottom region thereof adapted to receive said valve after said branching opening is formed in said existing pipe wherein said valve is selectively moved along said executing opening through said branch opening and into said space, clear of fluid flow as said fluid flows through said executing opening, through said branch pipe and through said coupling opening; and a valve operating means for moving said valve between said position sealing said pipe coupling opening, said position closing said interior portion of said existing pipe, while permitting bypass fluid to flow around said valve through said branching opening, through said branch pipe and into said pipe coupling opening due to the configuration of said valve, and into said space on said bottom region of said coupling case.

* * * * *

UNITED STATES PATENT AND TRADEMARK OFFICE
CERTIFICATE OF CORRECTION

PATENT NO. : 5,435,340
DATED : July 25, 1995
INVENTOR(S) : Masashi Tabuchi and Haruhiko Shimizu It is certified that error appears in the above-indentified patent and that said Letters Patent is hereby corrected as shown below:

Title page, in section '[22] Filed:', "May 19, 1993" should read --May 12, 1993--.

Column 4 Line 3 "valve 8" should read --valve 6--.

Signed and Sealed this

Tenth Day of October, 1995

*Attest:*

BRUCE LEHMAN

*Attesting Officer*  Commissioner of Patents and Trademarks